(12) United States Patent  
Weber

(10) Patent No.: US 7,260,988 B2
(45) Date of Patent: Aug. 28, 2007

(54) FUEL LEVEL SENDER CIRCUIT WITH ALTERNATING CURRENT DIRECTION

(75) Inventor: Charles F. Weber, Dexter, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 161 days.

(21) Appl. No.: 11/016,580

(22) Filed: Dec. 17, 2004

(65) Prior Publication Data

US 2006/0130574 A1    Jun. 22, 2006

(51) Int. Cl.
*G01F 23/00* (2006.01)

(52) U.S. Cl. .................... 73/304 R; 340/620

(58) Field of Classification Search ............. 73/304 R; 340/620
See application file for complete search history.

(56) References Cited

U.S. PATENT DOCUMENTS

| | | | |
|---|---|---|---|
| 4,253,330 A | | 3/1981 | Kato |
| 4,344,317 A | | 8/1982 | Hattori et al. |
| 4,386,406 A | | 5/1983 | Igarashi et al. |
| 4,513,277 A | * | 4/1985 | Moore et al. ............ 340/450.2 |
| 4,779,460 A | | 10/1988 | Cruickshank |
| 4,838,082 A | | 6/1989 | McCoy et al. |
| 4,967,181 A | * | 10/1990 | Iizuka et al. ............ 340/450.2 |
| 4,991,435 A | | 2/1991 | Colarossi |
| 5,027,656 A | | 7/1991 | Garrison |
| 5,044,344 A | | 9/1991 | Tuckey et al. |
| 5,050,433 A | * | 9/1991 | Lumetta .................... 73/313 |
| 5,140,303 A | | 8/1992 | Meyer |
| 5,150,615 A | | 9/1992 | Rymut et al. |
| 5,172,007 A | * | 12/1992 | Lumetta et al. ............ 307/10.1 |
| 5,345,398 A | | 9/1994 | Lippmann et al. |
| 5,483,109 A | | 1/1996 | Gholston |
| 5,826,459 A | * | 10/1998 | Kataoka et al. ........... 73/290 R |
| 5,880,480 A | | 3/1999 | Ellinger et al. |
| 5,913,294 A | | 6/1999 | Takahashi et al. |
| 6,564,631 B1 | | 5/2003 | Lake et al. |
| 6,571,626 B1 | | 6/2003 | Herford |
| 6,701,784 B1 | | 3/2004 | Matusek et al. |

(Continued)

OTHER PUBLICATIONS

Randall Aiken, "The Voltage Divider Rule", Aiken Amplification, Jan. 1, 2000.☐☐http://www.aikenamps.com/VoltageDividerRule.htm☐☐Accessed (Jul. 11, 2006).*

*Primary Examiner*—Hezron Williams
*Assistant Examiner*—Samir M. Shah
(74) *Attorney, Agent, or Firm*—Brinks Hofer Gilson & Lione

(57) ABSTRACT

The system includes a fuel sender and a controller. The fuel sender has a variable resistance and the variable resistance varies based on the quantity of fuel in the fuel tank. The controller is in electrical communication with the fuel sender. Further, the controller includes a voltage input for sensing a voltage across the fuel sender, and a voltage output that provides a biasing voltage to the fuel sender. The biasing voltage causes the voltage across the fuel sender to vary with relationship to the variable resistance of the fuel sender. Further, the voltage output is in communication with a circuit that is configured to alternate a direction of current flow through the fuel sender based on the voltage output. By alternating the direction of current flow through the fuel sender, corrosion to the fuel sender due to a reaction with the fuel is minimized.

16 Claims, 3 Drawing Sheets

U.S. PATENT DOCUMENTS

| | | | |
|---|---|---|---|
| 6,732,584 B2 * | 5/2004 | Rapala | 73/313 |
| 7,131,328 B2 * | 11/2006 | Eguchi et al. | 73/304 R |
| 7,131,329 B2 * | 11/2006 | Eguchi et al. | 73/304 R |
| 7,134,331 B2 * | 11/2006 | Eguchi et al. | 73/304 R |
| 7,134,332 B2 * | 11/2006 | Eguchi et al. | 73/304 R |
| 7,135,981 B1 * | 11/2006 | Lafontaine | 340/618 |
| 2003/0233875 A1 * | 12/2003 | Stehman et al. | 73/304 C |
| 2006/0208915 A1 * | 9/2006 | Oakner et al. | 340/620 |

* cited by examiner

FUEL LEVEL SENDER CIRCUIT WITH ALTERNATING CURRENT DIRECTION

BACKGROUND

1. Field of the Invention

The present invention generally relates to a system for determining a quantity of fuel in a fuel tank.

2. Description of Related Art

Typically, a fuel sender is used to determine the amount of fuel in a fuel tank. The fuel sender is a variable resistance device. The resistance of the fuel sender changes based on the amount of fuel in the fuel tank. Therefore, the fuel sender is biased with a current, and the voltage drop across the fuel sender is used to determine the amount of fuel in the fuel tank. Due to the increased use of alcohol based fuel, the current flowing through the fuel sender reacts with the fuel to cause corrosion of the fuel sender. The continuous current flowing through the fuel sender causes electrolysis due to the alcohol level in the fuel, resulting in the eventual corrosion of the fuel sender. It has been proposed to send current through the fuel sender at periodic intervals to reduce the corrosion caused by electrolysis, however, corrosion still occurs. Corrosion of the fuel sender may affect the resistance of the fuel sender affecting fuel readings and increasing warranty costs.

In view of the above, it is apparent that there exists a need for an improved system for determining a quantity of fuel in a fuel tank.

SUMMARY

In satisfying the above need, as well as overcoming the enumerated drawbacks and other limitations of the related art, the present invention provides a system for determining a quantity of fuel in a fuel tank.

The system includes a fuel sender and a controller. The fuel sender has a variable resistance and the variable resistance changes based on the quantity of fuel in the fuel tank. The controller is in electrical communication with the fuel sender and includes a voltage input for sensing a voltage across the fuel sender. The controller also has a voltage output that provides a biasing voltage to the fuel sender. The biasing voltage causes the voltage across the fuel sender to vary with relationship to the variable resistance of the fuel sender. Further, the voltage output is in communication with a circuit that is configured to alternate a direction of current flow through the fuel sender based on the voltage output. By alternating the direction of current flow through the fuel sender, corrosion to the fuel sender due to a reaction with the fuel is minimized.

The voltage output provides a biasing voltage to the fuel sender and a sampling frequency. Accordingly, the voltage input is synchronized with the voltage output to capture a voltage measurement while the voltage or output is configured to provide the biasing voltage.

In addition, the configuration of the circuit provides a first current path and a second current path. The circuit includes a first switch configured to direct current along the first current path when the first switch is conducting. Similarly, the circuit includes a second switch configured to direct current along the second current path when the second switch is conducting. The circuit also includes a first resistor in electrical series connection with the fuel sender to form a voltage divider. Accordingly, the voltage divider defines the relationship between the variable resistance of the fuel sender and the voltage measured by the voltage input of the controller.

Further objects, features and advantages of this invention will become readily apparent to persons skilled in the art after a review of the following description, with reference to the drawings and claims that are appended to and form a part of this specification.

DETAILED DESCRIPTION

Figure 1:
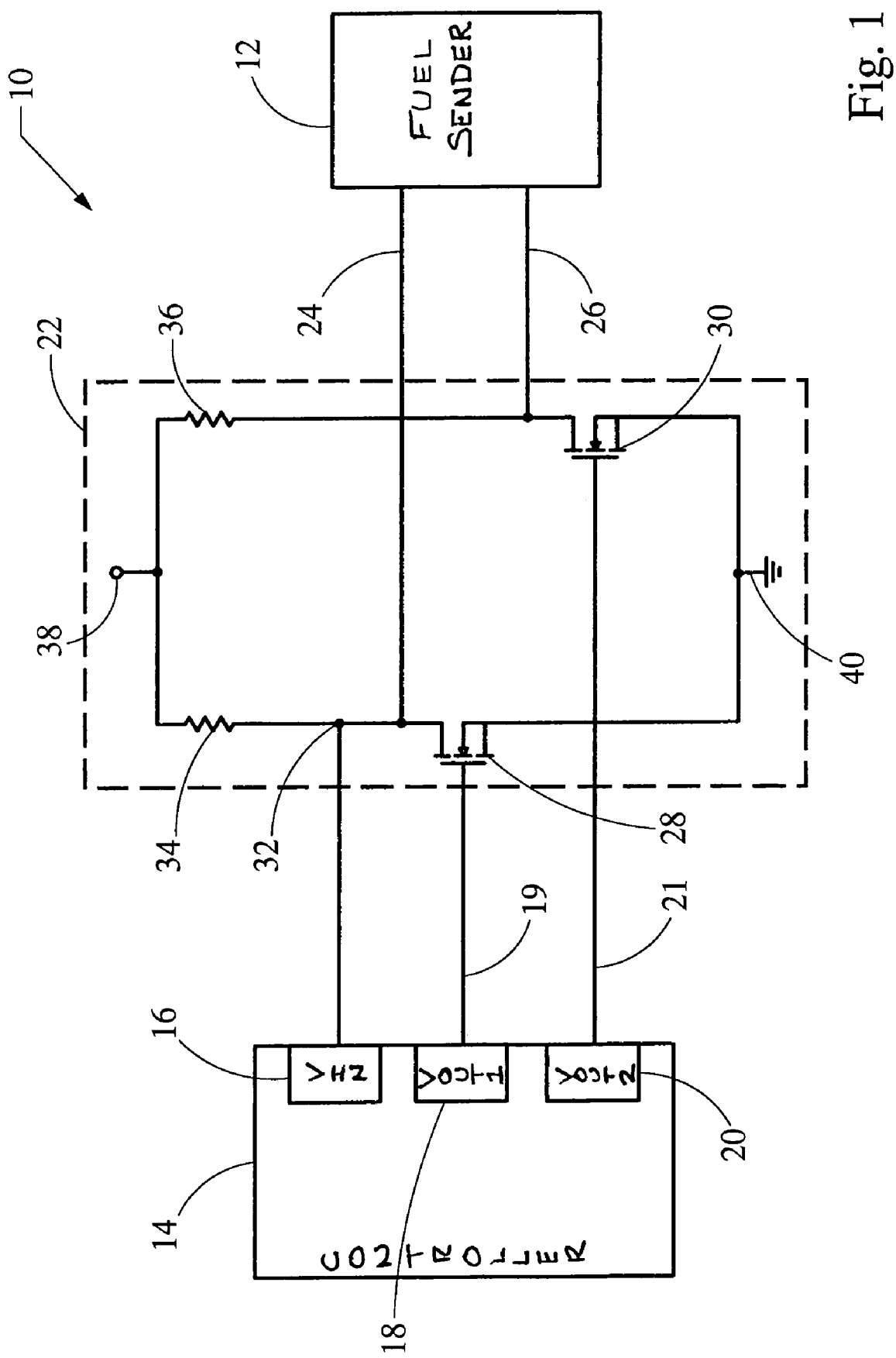
FIG. 1 is a system for determining a quantity of fuel in a fuel tank in accordance with the present invention.

Referring now to FIG. 1, a system embodying the principles of the present invention is illustrated therein and designated at 10. As its primary components, the system 10 includes a fuel sender 12, a controller 14, and a switching circuit 22.

The fuel sender 12 is located in the fuel tank and has a resistance that varies corresponding with the quantity of fuel in the fuel tank. The fuel sender 12 has a first terminal 24 and a second terminal 26. The variable resistance of the fuel sender 12 may be measured across the first and second terminal 24, 26. Generally, the variable resistance is measured by providing a biasing voltage across the first and second terminal 24, 26. The controller 14 includes a first voltage output 18 and a second voltage output 20 to control the bias voltage.

The voltage input 16 of the controller 14 is in communication with node 32 to sense the voltage drop across the first and second terminal 24, 26, thereby determining the variable resistance of the fuel sender 12. The controller 14 uses this information to determine the quantity of fuel in the fuel tank. The controller may use an equation or a lookup table to relate the variable resistance to the quantity of fuel in the fuel tank.

Switching circuit 22 couples the controller 14 to the fuel sender 12. The switching circuit 22 includes a power source 38, switch 28 and switch 30. The switching circuit 22 has two parallel branches running between the power source 38 and an electrical ground 40. The first branch includes resistor 34 and switch 28. The power source 38 is connected to one side of resistor 34, while the other side of resistor 34 is connected to the drain of switch 28, the voltage input 16 of controller 14 and the first terminal 24 of the fuel sender 12. The source of switch 28 is connected to the electrical ground 40. With regard to the second branch, the power source 38 is connected to a first side of resistor 36. The second side of resistor 36 is connected to the second terminal 26 of the fuel sender and the drain of switch 30. To complete the second branch, the source of switch 30 is connected to the electrical ground 40.

Switch 28 is shown as a N-channel MOSFET transistor, although other switching devices may be used. When the first voltage output 18 provides a voltage to the gate of switch 28 current will be allowed to flow from the drain to the source of switch 28. Similarly, switch 30 is shown as an N-channel MOSFET transistor, and as the second voltage output 20 provides voltage to the gate of switch 30 current will be allowed to flow from the drain to the source of switch 30.

However, a constant DC bias voltage leads to corrosion of the fuel sender 12. Therefore, the first and second voltage output 18, 20 may be independently driven by controller 14 to reduce corrosion of the fuel sender. As such, four operational states may be obtained (0-3). In state 0, both voltage signals 19 and 21 for circuit 22 are low making both transistor 28 and transistor 30 switch off into non-conducting states. In state 0, both parallel paths including resistor 34 and transistor 28, and resistor 36 and transistor 30 each have no current flowing resulting in both terminals 24 and 26 of the fuel sender 12 having a voltage relative to ground 40 equal to voltage source 38. Additionally, the voltage at node 32 and, therefore, sensed by voltage input 16 of controller 14, is equal to voltage source 38. Accordingly, the differential voltage across fuel sender 12 is equal to 0 volts and corrosion to the fuel sender 12, due to fuel containing high concentrations of alcohol, is minimized since the circuit provides no net DC bias voltage across the fuel sender.

In state 1, both voltage signals 19 and 21 for circuit 22 are high making both transistor 28 and transistor 30 on and in a conducting state. In this state, both parallel paths including resistor 34 and transistor 28, and resistor 36 and transistor 30 each allow current to flow. Therefore, terminal 24 and terminal 26 have a voltage equal to electrical ground 40. Additionally, the voltage at node 32 is equal to ground. The differential voltage across fuel sender 12 is equal to 0 volts. In this state, corrosion to the fuel sender 12, due to fuel containing high concentrations of alcohol is minimized since the fuel sender 12 has no net DC bias voltage.

In state 2, voltage signal 19 is high making transistor 28 conduct. Voltage signal 21 is low, therefore, transistor 30 is in a non-conducting state. In state 2, there are two parallel conducting paths. Path 1 is comprised of resistor 34 and transistor 28 placing node 32 at ground potential. Path 2 is comprised of resistor 36, fuel sender 12, and transistor 28. In this state, terminal 26 of the fuel sender 12 is presented a positive bias voltage from resistor 36, and terminal 24 is presented a negative bias voltage from transistor 28. The DC bias voltage provided to the fuel sender 12 will cause corrosion if present for extended periods of time. In this state, no voltage sensing is available to controller 14 because node 32 and voltage input 16 are forced to ground.

In state 3, voltage signal 21 is high making transistor 30 conduct, while voltage signal 19 is low causing transistor 28 to be in a non-conducting state. In state 3, two parallel conducting paths exist. Path 1 includes resistor 36 and transistor 30. Path 2 includes resistor 34, fuel sender 12 and transistor 30. In this state, terminal 24 of the fuel sender 12 is provided a positive bias voltage from resistor 34 and terminal 26 is presented a negative bias voltage from transistor 30. Additionally, this state provides the fuel sender 12 a DC bias voltage that is the opposite polarity to state 2. As in state 2, the DC bias voltage will cause corrosion if present at fuel sender 12 for extended periods of time. However, a voltage is present at node 32 and can be measured by the controller 14 at voltage input 16. The voltage at node 32 changes according to the fuel level transfer function of the fuel sender 12. The voltage, neglecting a small error due to non-ideal switch characteristics of transistor 30 is based on the relationship $$V = V_s \left( \frac{R_s}{R_1 + R_s} \right)$$

where V is the voltage across the fuel sender, $V_s$ is the voltage of a power supply, R1 is the resistance of resistor 34 and $R_s$ is the variable resistance of the fuel sender 12.

Corrosion of the fuel sender 12 may be minimized by alternating equal time between state 2 and state 3 above. The controller 14 alternates state 2 and 3 so that the net DC voltage applied to the fuel sender 12 is equal to zero. Further, the controller 14 is configured so that the net DC volt-seconds applied to fuel sender 12 also equals zero. State 0 and state 1 may also be used without effect on the corrosion of the fuel sense resistor. Although not required, state 0 may be useful as a resting state between state 2 and state 3 to minimize electrical consumption between samples of the voltage at node 32.

Figure 2:
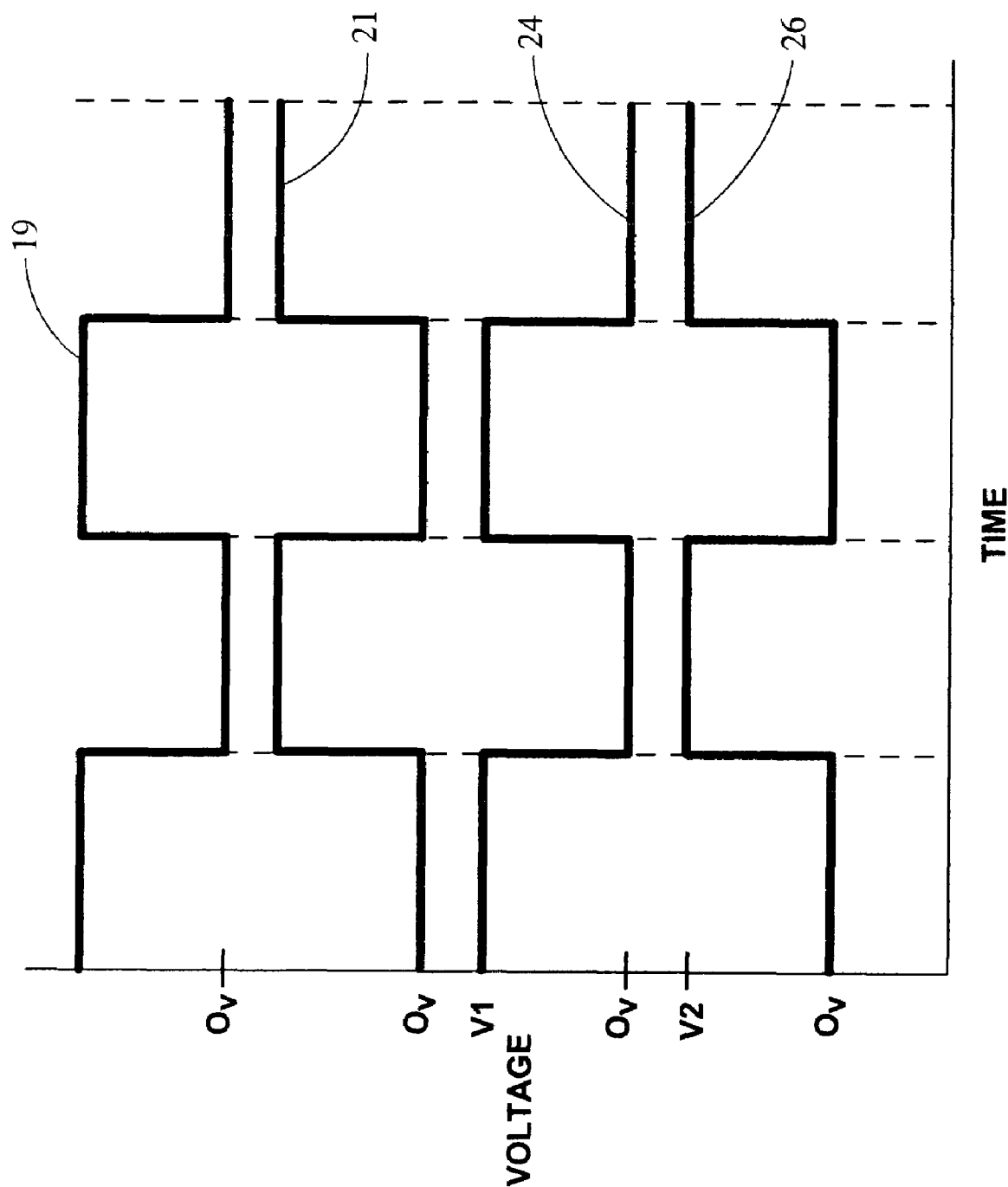
FIG. 2 is a graph of the voltage signals for the system in accordance with the present invention.

Further, each voltage output may be controlled to generate a square wave with a given frequency and duty cycle to bias the fuel sender 12. The first voltage output 18 generates voltage signal 19 that is provided to a switch 28 of the switching circuit 22 and the second voltage output 20 generates voltage signal 21 that is in communication with switch 30. Voltage signal 19 and voltage signal 21 act as an inverse of each other, as shown in FIG. 2. While voltage signal 19 is high, voltage signal 21 is low. Alternatively, while voltage signal 21 is high, voltage signal 19 is low. Corresponding to the first and second voltage signal 19, 21, when switch 28 is conducting switch 30 is not conducting, and while switch 30 is conducting, switch 28 is not conducting.

Based on the timing of the first and second voltage signals 19, 21, two alternative current paths through the fuel sender 12 are formed. While switch 28 is conducting as in state 2, current flows from the power source 38, through resistor 36, into the second terminal 26 of the fuel sender 12, out the first terminal 24 of the fuel sender 12, and through switch 28 to electrical ground 40.

Alternatively, when switch 30 is conducting as in state 3, current flows from power source 38 through resistor 34, into the first terminal 24 of the fuel sender 12, out of the second terminal 26 of the fuel sender 12, and through switch 30 to an electrical ground 40. As such, resistor 34 essentially forms a voltage divider with the variable resistance of the fuel sender 12. Accordingly, the voltage input 16 of the controller 14 senses a voltage at node 32. The voltage at node 32 is based on the relationship $$V = V_s \left( \frac{R_s}{R_1 + R_s} \right)$$

where V is the voltage at node 32, $V_s$ is the voltage of power supply 38, R1 is the resistance of resistor 34, and $R_s$ is the variable resistance of the fuel sender 12.

As such, the controller 14 alternates the first and second voltage output 18, 20 according to a predetermined sampling frequency. To consistently measure voltage drop across the fuel sender 12, the controller 14 synchronizes the voltage input 16 to capture a voltage measurement while the second voltage output 20 is high and the bias voltage is provided to the fuel sender 12 through the second current path including resistor 34 and switch 30.

The voltage polarity between the first and second terminals 24, 26 also alternates in conjunction with voltage signal 19 and 21 as depicted in FIG. 2. As such, the direction of current flowing through the fuel sender 12 alternates corresponding to the first and second voltage signal 19, 21. The alternating current further serves to reduce the interaction of the fuel sender 12 with the fuel minimizing corrosion of the fuel sender 12.

Figure 3:
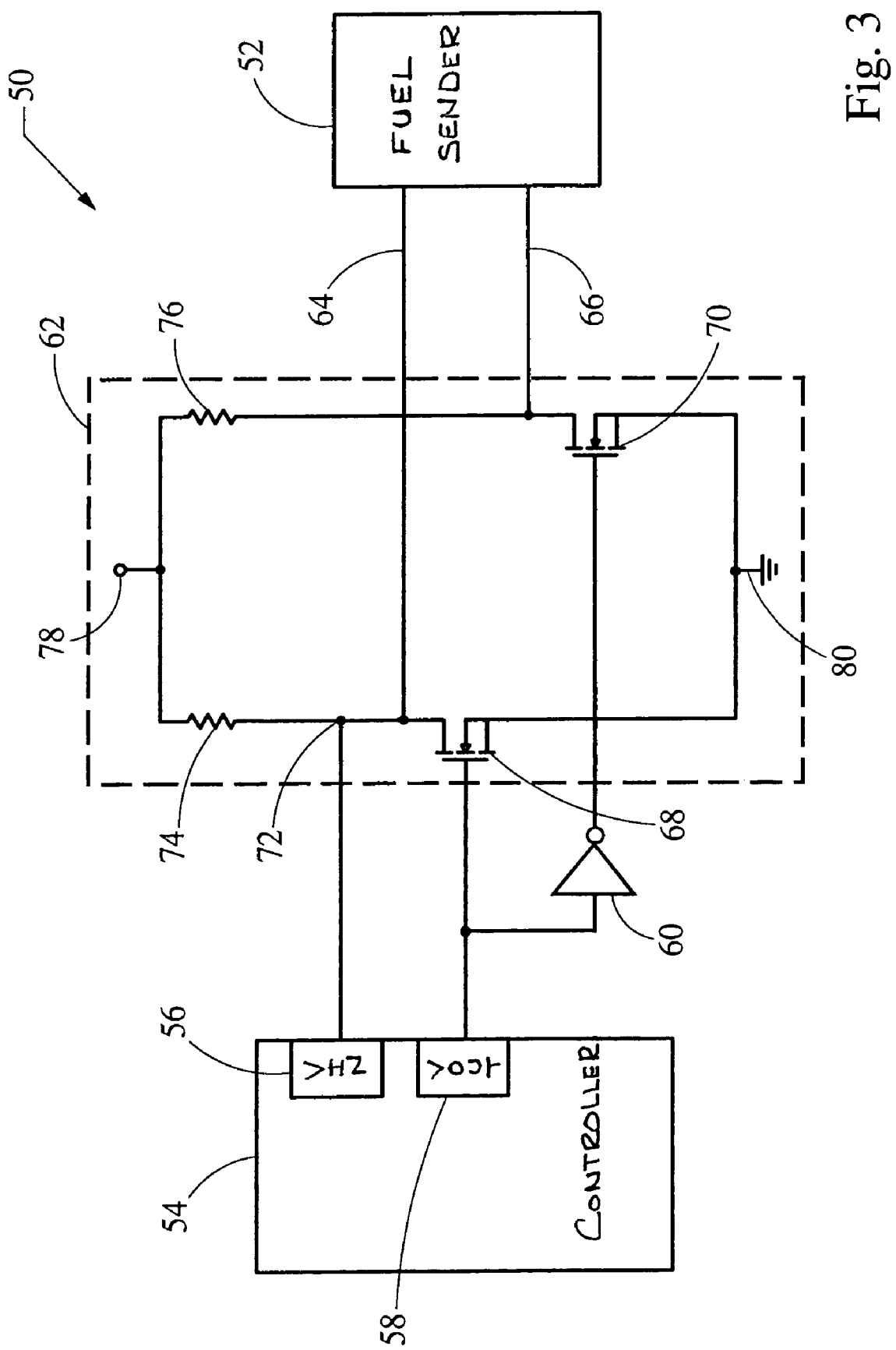
FIG. 3 is another embodiment of a system for determining a quantity of fuel in the fuel tank in accordance with the present invention.

Referring now to FIG. 3, another system embodying the principles of the present invention is illustrated therein and designated at 50. As its primary components, the system 50 includes a fuel sender 52, a controller 54, and a switching circuit 62.

The fuel sender 52 has a first terminal 64 and a second terminal 66. The variable resistance of the fuel sender 52 may be measured across the first and second terminal 64, 66. The voltage input 56 of the controller 54 is in communication with node 72 to sense the voltage drop across the first and second terminal 64, 66, thereby determining the variable resistance of the fuel sender 52. The controller 54 uses this information to determine the quantity of fuel in the fuel tank. The controller may use an equation or a lookup table to relate the variable resistance to the quantity of fuel in the fuel tank.

In addition, the controller 54 has a voltage output 58. The voltage output 58 generates square wave with a given frequency and duty cycle to bias the fuel sender 52. The voltage output 58 generates a voltage signal that is provided to switch 68 of the switching circuit 62. The voltage signal is also provided to an inverter 60 to generate an inverted voltage signal that is in communication with switch 70.

The switching circuit 62 includes a power source 78, switch 68 and switch 70. Switch 68 is shown as a N-channel MOSFET transistor, although other switching devices may be used. When the first voltage output 58 provides a voltage to the gate of switch 68 current will be allowed to flow from the drain to the source of switch 68. Similarly, switch 70 is shown as an N-channel MOSFET transistor, and as the inverter 60 provides voltage to the gate of switch 70 current will be allowed to flow from the drain to the source of switch 70.

Based on the timing of the voltage output 58, two alternative current paths are formed. While switch 68 is conducting, current flows from the power source 78, through resistor 76, into the second terminal 66 of the fuel sender 52, out the first terminal 64 of the fuel sender 52, and through switch 68 to electrical ground 80. Alternatively, when switch 70 is conducting, current flows from power source 78 through resistor 74, into the first terminal 64 of the fuel sender 52, out of the second terminal 66 of the fuel sender 52, and through switch 70 to an electrical ground 80. As such, resistor 74 forms a voltage divider with the variable resistance of the fuel sender 52. Accordingly, the voltage input 56 of the controller 54 senses a voltage at node 72. Similar to the previous embodiment, the voltage at node 72 is based on the relationship $$V = V_s \left( \frac{R_s}{R_1 + R_s} \right)$$

where V is the voltage at node 72, $V_s$ is the voltage of power supply 78, R1 is the resistance of resistor 74, and $R_s$ is the variable resistance of the fuel sender 52.

To consistently measure voltage drop across the fuel sender 52, the controller 54 synchronizes the voltage input 56 to capture a voltage measurement while the bias voltage is provided to the fuel sender 52 through the current path including resistor 74 and switch 70. The voltage polarity between the first and second terminals 64, 66 also alternates in conjunction with the voltage signal from voltage output 58. As such, the direction of current flowing through the fuel sender 12 alternates to reduce the interaction of the fuel sender 12 with the fuel minimizing corrosion of the fuel sender 12.

As a person skilled in the art will readily appreciate, the above description is meant as an illustration of implementation of the principles of this invention. This description is not intended to limit the scope or application of this invention in that the invention is susceptible to modification, variation and change, without departing from the spirit of this invention, as defined in the following claims.

I claim:

1. A system for measuring fuel quantity in a fuel tank, the system comprising:
   a fuel sender having a variable resistance, where the variable resistance is based on a quantity of fuel in the fuel tank:
   a controller in communication with the fuel sender, the controller including a voltage input and a voltage output, the voltage input for sensing a voltage across the fuel sender, the voltage output providing a biasing voltage to the fuel sender, a circuit in communication with the controller and the fuel sender, wherein the circuit is configured to alternate a current flow through the fuel sender between a first and second direction, the voltage input being synchronized with the voltage output to capture a voltage measurement while the biasing voltage is provided to the fuel sender.

2. The system according to claim 1, wherein the voltage output provides the biasing voltage to the fuel sender at a sampling frequency.

3. The system according to claim 1, wherein the circuit includes a first current path and a second current path.

4. The system according to claim 3, wherein the circuit includes a first switch configured to direct current along the first current path when the first switch is conducting.

5. The system according to claim 4, wherein the circuit includes a second switch configured to direct current along the second current path when the second switch is conducting.

6. The system according to claim 1, wherein the circuit includes a first resistor in series with the fuel sender to form a voltage divider.

7. The system according to claim 6, wherein the circuit includes a second switch in electrical series connection with the first resistor.

8. The system according to claim 7, wherein voltage across the fuel sender is based on the relationship $$V = V_s \left( \frac{R_s}{R_1 + R_s} \right)$$

where V is the voltage across the fuel sender, $V_s$ is the voltage of a power supply, R1 is the resistance of the first resistor and $R_s$ is the variable resistance of the fuel sender.

9. A system for measuring fuel quantity in a fuel tank, the system comprising:
   a fuel sender having a variable resistance, where the variable resistance is based on a quantity of fuel in the fuel tank:

a controller in communication with the fuel sender, the controller including a voltage input, a first voltage output, and a second voltage output, the voltage input for sensing a voltage across the fuel sender, the first voltage output in communication with a first switch for providing a biasing voltage to the fuel sender, and the second voltage output in communication with a second switch for alternating a direction of current flow through the fuel sender, voltage input being synchronized with the first voltage output to capture a voltage measurement while the biasing voltage is provided to the fuel sender.

10. The system according to claim 9, wherein the first voltage output provides the biasing voltage to the fuel sender at a sampling frequency.

11. The system according to claim 9, wherein the fuel sender and the first switch form a first current path and the fuel sender and the second switch form a second current path.

12. The system according to claim 11, wherein the first switch is configured to direct current along the first current path when the first switch is conducting.

13. The system according to claim 12, wherein the second switch is configured to direct current along the second current path when the second switch is conducting.

14. The system according to claim 11, wherein the first current path includes a first resistor in series with the fuel sender to form a voltage divider.

15. The system according to claim 14, further comprising a second switch in electrical series connection with the first resistor.

16. The system according to claim 15, wherein the voltage across the fuel sender is based on the relationship $$V = V_s \left( \frac{R_s}{R_1 + R_s} \right)$$

where V is the voltage across the fuel sender, $V_s$ is the voltage of a power supply, R1 is the resistance of the first resistor and $R_s$ is the variable resistance of the fuel sender.

* * * * *